US006697631B1

(12) United States Patent
Okamoto

(10) Patent No.: US 6,697,631 B1
(45) Date of Patent: Feb. 24, 2004

(54) RECEIVER FOR RECEIVING BROADCASTING SIGNAL

(75) Inventor: Tadashi Okamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/558,735

(22) Filed: Apr. 26, 2000

(30) Foreign Application Priority Data

Apr. 26, 1999 (JP) ........................................ P11-117719

(51) Int. Cl.[7] .................................................. H04Q 7/20

(52) U.S. Cl. ...................... 455/457; 455/456.1; 455/98; 455/145; 455/456.6

(58) Field of Search ................................ 455/457, 130, 455/145, 158.4, 456, 566, 414, 91, 418, 412, 422

(56) References Cited

U.S. PATENT DOCUMENTS 5,393,713 A * 2/1995 Schwob ................... 455/158.5
5,497,372 A * 3/1996 Nankoh et al. ............. 370/480
5,584,051 A * 12/1996 Goken ......................... 455/68
5,638,114 A * 6/1997 Hatanaka et al. ........ 348/14.09
5,732,338 A * 3/1998 Schwob ................... 455/158.5
6,181,921 B1 * 1/2001 Konisi et al. ............ 455/186.2
6,359,571 B1 * 3/2002 Endo et al. ................. 340/988

* cited by examiner

*Primary Examiner*—William Trost
*Assistant Examiner*—Marcos Torres
(74) *Attorney, Agent, or Firm*—Jay H. Maioli

(57) ABSTRACT

A receiver is rapidly and accurately tuning a broadcast frequency and selecting a broadcast program by simple operation and also for clearly informing the user of receivable broadcast frequencies. Besides a number of broadcast programs, information indicating the transmission site position for the broadcast RF, the station name broadcasting that RF, the program name, and information showing whether or not the multiplexed program is a regional program matching a designated region, is also multiplexed on the digital audio broadcast and RF received and demodulated in a receiver section. When a broadcast radio wave is received from a tuned in station, a control section extracts the position information on the transmission site, the broadcast station name, and program name of the regional program from the radio wave and displays a mark indicating the position of the transmission site, the broadcast station name, and program name of the regional program on a map shown on an LCD display, based on the information that was extracted from the radio wave. Tuning of the desired broadcast radio wave and selection of the broadcast program is performed by the user specifying a position on a map.

5 Claims, 8 Drawing Sheets

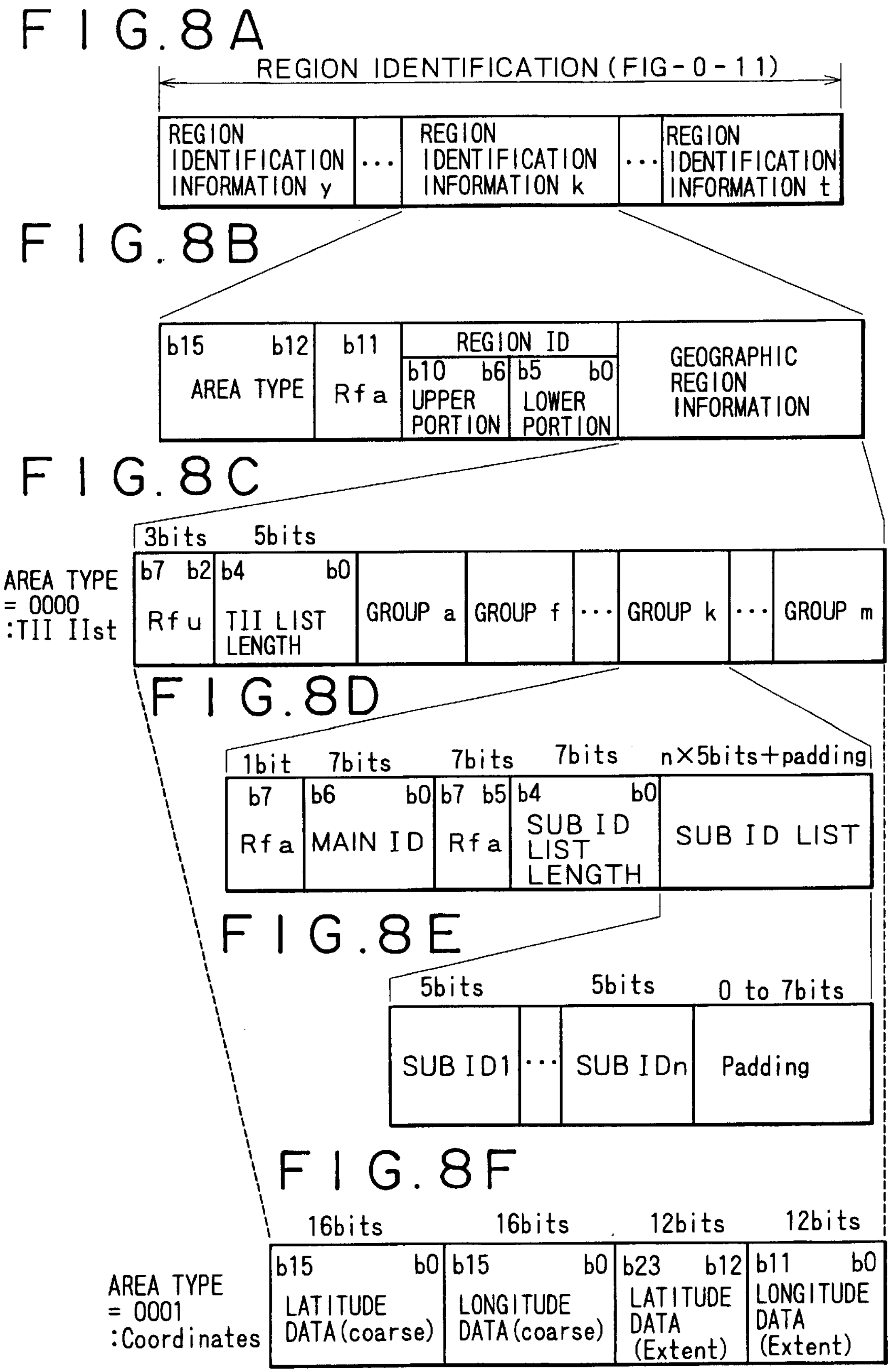
FIG. 8A
REGION IDENTIFICATION (FIG-0-11)
REGION IDENTIFICATION INFORMATION y
...
REGION IDENTIFICATION INFORMATION k
...
REGION IDENTIFICATION INFORMATION t
FIG. 8B
b15 b12 AREA TYPE
b11 Rfa
REGION ID
b10 b6 UPPER PORTION
b5 b0 LOWER PORTION
GEOGRAPHIC REGION INFORMATION
FIG. 8C
3bits 5bits
AREA TYPE = 0000 :TII list
b7 b2 Rfu
b4 b0 TII LIST LENGTH
GROUP a
GROUP f
...
GROUP k
...
GROUP m
FIG. 8D
1bit 7bits 7bits 7bits n×5bits+padding
b7 Rfa
b6 b0 MAIN ID
b7 b5 Rfa
b4 b0 SUB ID LIST LENGTH
SUB ID LIST
FIG. 8E
5bits 5bits 0 to 7bits
SUB ID1
...
SUB IDn
Padding
FIG. 8F
16bits 16bits 12bits 12bits
AREA TYPE = 0001 :Coordinates
b15 b0 LATITUDE DATA (coarse)
b15 b0 LONGITUDE DATA (coarse)
b23 b12 LATITUDE DATA (Extent)
b11 b0 LONGITUDE DATA (Extent)

RECEIVER FOR RECEIVING BROADCASTING SIGNAL

BACKGROUND OF THE INVENTION

1. Field of the Invention

This invention relates to a receiver for receiving broadcast signals such as digital audio broadcasts referred to as DAB (Digital Audio Broadcasting).

2. Description of the Related Art

Radio receivers are configured to allow easily tuning in a broadcast radio wave with a simple operation. A tuning button or tuning switch installed in a radio receiver for instance, permits frequency information assigned to a particular broadcast station to be stored beforehand in the memory.

When the user presses the radio receiver tuning button or tuning switch, the frequency information assigned to the tuning button/switch that was depressed is called up, and based on this frequency information, operations such as tuning in the broadcast radio wave for the desired broadcast station and displaying the frequency information of the tuned-in broadcast radio wave on an LCD (liquid crystal display) are performed.

Therefore, if the frequency information assigned to a particular broadcast station is registered beforehand in the memory of the radio receiver, then the broadcast radio wave from the desired broadcast station can be received and tuned in by simply pressing the tuning button/switch and the audio from that broadcast station can be heard.

However, when frequency information assigned to a broadcast station was registered beforehand in the memory as described above, then a receivable broadcast radio wave (RF) had to be searched for, by for instance, rotating the tuning dial. Problems therefore occurred when the radio receiver was not at a fixed position, such as when using vehicle-mounted radio receivers and portable radio receivers, etc.

Radio broadcasts for instance are wide ranging broadcasts for a wide area, and regional broadcasts only for a particular area. Regional broadcasts for instance, in many cases offer traffic information or information valid only for a particular region. When a listener in a vehicle is currently passing through a particular region and wants to hear traffic information for that region, the listener may not know the frequency of the station broadcasting traffic information and so cannot easily hear traffic information for that region.

When a particular region, and the frequency assigned to the broadcast station transmitting broadcast radio waves receivable in that region are not known in advance, then easily, rapidly and accurately finding the desired regional program in advance is difficult.

SUMMARY OF THE INVENTION

In view of the above problems, it therefore an object of this invention to provide a receiver that clearly informs the user in advance, of receivable broadcast radio waves and allows speedy, accurate, and easy tuning of the desired broadcast radio waves to select the broadcast program.

To resolve the above mentioned problems, according to one aspect of the present invention, there is provided a receiver comprising receive means for receiving broadcast radio waves including broadcast-related information which contains at least position information on a transmission site, display means, map display control means for displaying the display means on a map, information extraction means for extracting the broadcast-related information from the broadcast radio waves received by the receive means, and information display control means for displaying information, relating to the broadcast radio waves, on the map shown on the display means, at a position specified according to position information among the broadcast-related information extracted by the information extraction means.

According to one aspect of the present invention, the broadcast-related information contained in the broadcast radio wave received by the receive means is extracted by the information extraction means. Position information for specifying the position of the transmission site that transmitted the broadcast radio wave received by the receive means is contained in the broadcast-related information, and information related to the broadcast radio wave that was received is overlapped at a position on the map shown on the display means according to the position information.

The desired broadcast radio wave can be visually recognized based on information related to the broadcast radio wave displayed while overlapped onto the map shown on the display means, and the station can be tuned in.

Further, according to another aspect of the present invention, there is provided a receiver comprising information storage means for storing information relating to a display position shown on the map accompanying with tuning information for the broadcast radio wave received by the receive means; command input receive means for inputting commands from the user specifying a position on the map displayed on the display means; and tuning control means for loading from the memory, tuning information matching the position on the map specified by way of the command input receive means and tuning in the broadcast radio wave based on the tuning information that was loaded.

According to another aspect of the present invention, the broadcast radio wave tuning information received by the receive means, and the display position information relating to the broadcast radio wave, for the map displayed on the display means, are matched and stored in the memory by the information storage means.

When receiving starts for example, in response to user instructions, the broadcast radio waves (band) are scanned for broadcast radio waves receivable at the current position. Information relating to a plurality of receivable broadcast radio waves (frequencies) is displayed while overlapped onto a map shown on the display means, and related display information is matched with the tuning information and stored in the memory.

When instructions input by the user that specify a position on a map shown on the display means are received by way of the command input receive means, the tuning information for the broadcast radio wave matching the information relating to the specified position on the displayed map, is loaded from the memory and the target broadcast radio wave is automatically tuned in by the tuning control means according to the tuning information that was loaded.

The user can thus visually determine the desired broadcast radio wave based on information relating to that broadcast radio wave and map shown on the display means, tune in that desired broadcast radio wave and can then listen to the broadcast program provided on the broadcast radio wave. In other words, even if the user does not know information such as the frequencies of receivable broadcast radio waves, a desired broadcast radio wave can still be automatically tuned in based on the display information shown on the display means.

According to another aspect of the present invention, the receiver further comprises: position measurement means for measuring the receiver's own current position by receiving a radio wave from an artificial satellite. The map display control means receives the current position supplied from the position measurement means and displays a map containing the current position on display means.

According to another aspect of the present invention, the receiver has a GPS (Global Positioning System) as the position measurement means, for accurately measuring the receiver's own current position, and a map containing this current measured position to be shown on the display means by the map display control means.

Thus, even a receiver for instance, installed in a vehicle moving across a comparatively wide area, can know the receivable broadcast radio waves at the current position and can tune in the desired broadcast radio wave. Receivable broadcast radio waves for a desired broadcast radio wave can furthermore be rapidly and accurately tuned in, with a simple operation.

According to another aspect of the present invention, the information display control means displays a mark indicating the position of the broadcast radio wave transmission site at a position on the map determined according to the position information.

According to another aspect of the present invention, a mark indicating the position of the broadcast station of the received broadcast radio wave is displayed so as to show a position on a map according to position information extracted from the broadcast radio wave received by the information extraction means, and by the information display control means.

The desired broadcast radio wave can thus be selected visually, based on the position of the transmission site displayed by overlapping onto a map shown on the display means.

According to another aspect of the present invention, the broadcast station name is contained in the broadcast-related information of that broadcast radio wave, and the information display control means performs display of the name of the broadcast station on a position on the map, determined according to the broadcast-related information extracted by the information extraction means.

According to another aspect of the present invention, the broadcast station name of the broadcast radio wave is conveyed while contained in the broadcast-related information. This broadcast station name is displayed on a position on a map according to the position information extracted from the received broadcast radio wave by the information display control means and the information extraction means.

The desired broadcast radio wave can therefore be selected visually, by means of the display showing the position of the transmission site of the broadcast radio wave, and the broadcast station name of the broadcast radio wave sent from that transmission site.

According to another aspect of the present invention, identification information is contained in the broadcast radio wave for identifying whether or not each program from a plurality of broadcast programs multiplexed on broadcast-related information of the broadcast radio wave are regional programs for a particular region or not, and the receiver comprises check means for determining whether to accept or reject each of the plurality of the broadcast programs as a regional program, based on the identification information from broadcast-related information extracted by the information extraction means, and the information display control means shows a display at a position on a map according to position information indicating a regional program is being broadcast from the received broadcast radio wave.

According to another aspect of the present invention, identification information is contained in a broadcast radio wave for transmission for identifying whether or not each program from a plurality of broadcast programs multiplexed on broadcast-related information of the broadcast radio wave are regional programs for a particular region or not; and based on the identification information, check means determines whether a regional program is being broadcast.

When determined that a region program is being broadcast, the information display control means shows a display indicating a regional program broadcast, at a position on a map according to position information, from broadcast-related information extracted from the received broadcast radio wave.

The regional programs such as traffic information for a particular region can therefore be visually recognized from the radio waves of the broadcast and the desired regional program can be easily and speedily selected. The regional programs in an area being moved through can thus be repidly heard by the user when the receiver is mounted in a vehicle or when the receiver is carried as a portable unit while walking around.

According to another aspect of the present invention, identification information is contained in the broadcast radio wave for identifying whether or not each program name from a plurality of multiplexed broadcast programs on broadcast-related information of the broadcast radio wave, and each of the plurality of multiplexed broadcast programs are regional programs for a particular region, and the receiver comprises check means for determining whether or not each of the plurality of the broadcast programs is a regional program, based on the identification information from the broadcast-related information extracted by the information extraction means, and the information display control means displays a program name for a program determined to be a regional program by the check means, at the position on the map determined according to the position information.

According to another aspect of the present invention, the program name of the program determined to be a regional program by the check means, is displayed on a map shown on a display means, at the position determined according to position information extracted from the broadcast radio wave.

The user is thus reliably informed without errors, about what regional programs of what name are broadcast by broadcast radio waves sent from which transmission site.

According to another aspect of the present invention, information storage means matches the tuning information of the radio broadcast wave of a program determined to be a regional program by the check means, with selection information for selecting the applicable regional program, and the display position on the map for displaying the program name and stores the above tuning information, the selection information and the display position in the memory and, tuning control means for loading the selection information and the tuning information matching a specified position on the map when the user specifies a program name display position shown on the map by using the command input receive means. The desired broadcast radio wave is then tuned in based on the tuning information loaded from the memory and the desired broadcast radio wave is selected based on the selection information that was loaded.

According to another aspect of the present invention, when the user specifies a position on a map displayed with the program name of a regional program by using the command input receive means, the tuning information and selection information stored in the memory corresponding to the display position for displaying the program name of a regional program are loaded from the memory. Based on this tuning information and selection information, the broadcast radio wave of the transmitted regional program is tuned and the desired regional program can be automatically selected and heard.

The regional program of a desired region can therefore be reliably selected and heard by a simple operation as described above. Therefore, when, for instance the receiver is mounted in a vehicle or when the receiver is carried as a portable unit while walking around, the regional programs in an area being moved through can be easily and reliably heard by the user According to another aspect of the present invention, area information showing each service area for each broadcast program specified by program selection information is contained in the broadcast-related information of the broadcast radio wave and, the information display control means displays the service area for the regional program on a map shown on a display means, based on area information in the broadcast-related information extracted from the received broadcast radio wave by the information extraction means.

According to another aspect of the present invention, when the broadcast radio wave of a regional broadcast is received, the user can be clearly informed about what region that regional program broadcast corresponds to, and the user can therefore reliably select and listen to the program broadcast for the desired region.

According to another aspect of the present invention, an area name according to a receivable area is contained in the broadcast-related information of the broadcast radio wave, and the information display control means displays the area name of the broadcast-related information extracted by the information extraction means, on map information shown on the display means.

According to another aspect of the present invention, an area name according to a receivable area extracted from the broadcast radio wave is displayed on map information shown on a display means. The user can therefore more clearly know receivable areas whose receivable broadcast radio waves are sent from transmission sites.

BRIEF DESCRIPTION OF THE DRAWINGS

FIGS. 8A to 8F are drawings describing the region identification information transmitted by means of the FIC (first information channel) of the DAB radio wave.

DESCRIPTION OF THE PREFERRED EMBODIMENTS

The preferred embodiments of the receiver of this invention will next be described while referring to the accompanying drawings. The description of the embodiment of this invention will utilize a vehicle-mounted receiver for receiving European standards (Eureka147) digital audio broadcasts referred to as the DAB (Digital Audio Broadcast).

Figure 1:
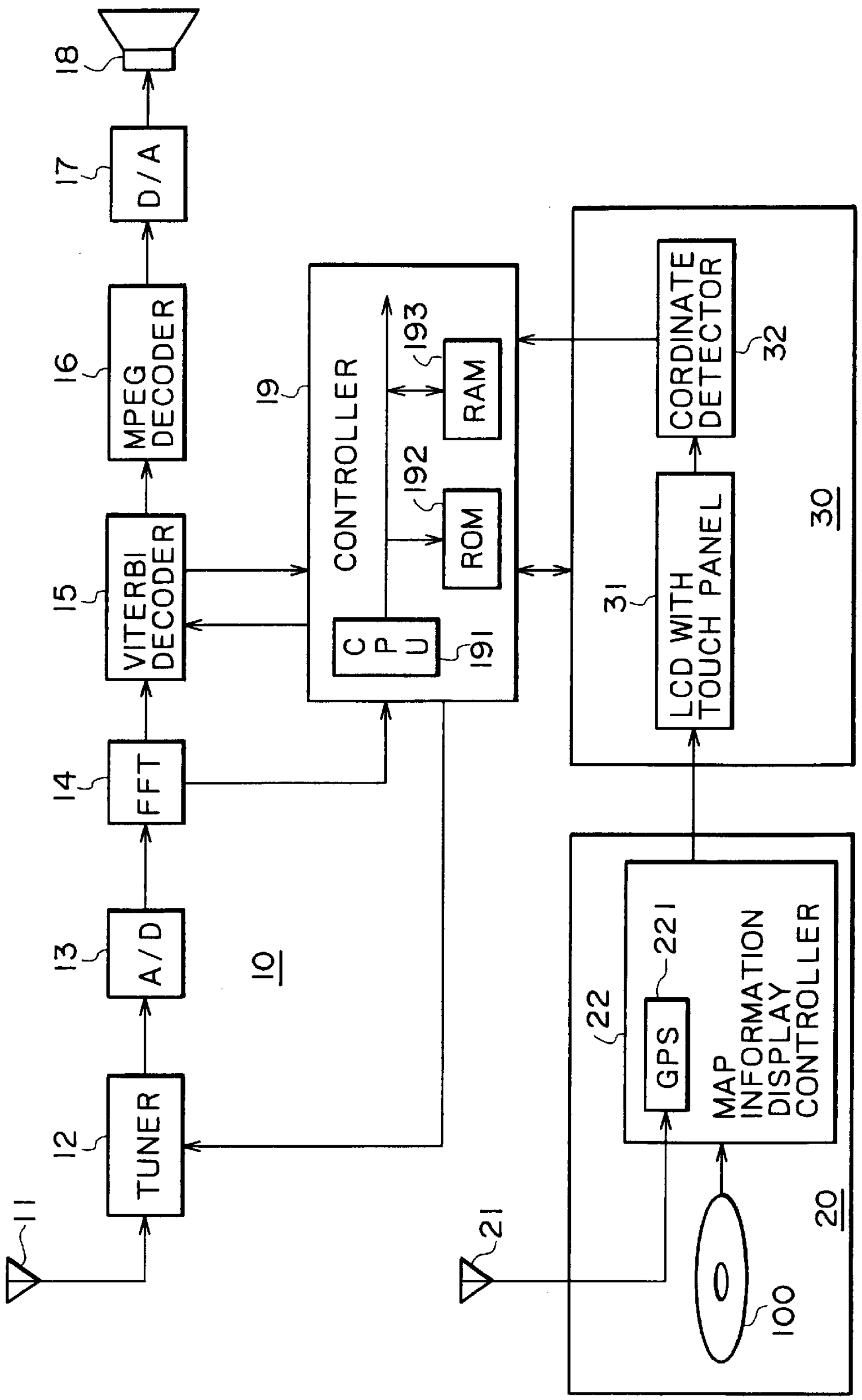
FIG. 1 is a block diagram describing an embodiment of the receiver of this invention.
Figure 2:
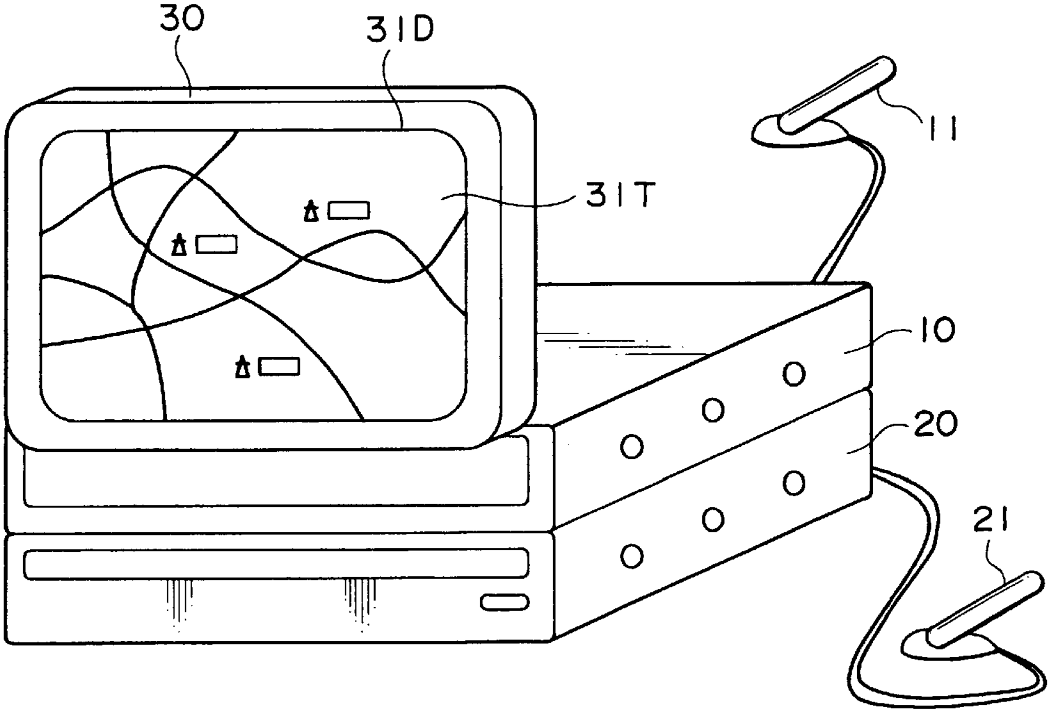
FIG. 2 is a drawing showing the external appearance of the receiver of FIG. 1.

A block diagram for describing the receiver of this embodiment is shown in FIG. 1. A view showing the outer appearance of the receiver of this embodiment is shown in FIG. 2. As can be seen in FIG. 1, the receiver of this embodiment can be broadly grouped into a receiver device 10, a navigation device 20, and a display device 30.

The receiver device 10 is comprised of an antenna 11, a tuner 12, a A/D converter 13, and FFT (high speed Fourier converter) 14, a Viterbi decoder 15, an MPEG decoder 16, a D/A converter 17, a speaker 18, and a controller 19 as shown in FIG. 1.

This receiver device 10 receives and tunes in DAB broadcast radio waves, extracts and demodulates the broadcast program selected by the user from among a plurality of multiplexed broadcast programs available on the received broadcast radio waves, and makes the selected broadcast program audible to the listener.

The navigation device 20 contains a map information display controller 22 equipped with GPS 221 as a means to measure the current position. Along with displaying map information containing the current position on an LCD 31 of the subsequently described display device 30, the current position is itself also displayed and so-called road guidance also provided. Map information is recorded on the CD-ROM 100 inserted in the navigation device 20.

The display device 30 as shown in FIG. 2 comprises an LCD (liquid crystal display) 31 having a comparatively large display screen 31D as shown in FIG. 2. Map information and other items described in detail later, such as the position of the broadcast station sending the DAB broadcast radio waves are shown on the display screen 31D of the LCD 31.

A touch panel 31T is affixed over the entire surface of the display screen 31D of the LCD 31. Operation of this touch panel 31T is linked with a coordinate detector 32 and functions as the command input receive means to accept commands entered by the user. A position specified by the user on the display screen 31D can also be supplied as coordinate data to the controller 19.

The DAB received on the receiver of this embodiment is sent as a broadcast radio wave (ensemble signal) formed of multiplexed audio data for a plurality of broadcast programs and all types of control information and appended information. The audio data is subjected to high efficiency encoding (data compression) utilizing the MPEG audio format which is the international standard, and transmission path encoding also performed utilizing error correction with overlap encoding.

Then, besides interleaving of bit strings such as the encoded audio data, the DAB is subjected to orthogonal frequency division multiplex modulation (OFDM) and then transmitted.

Figure 3:
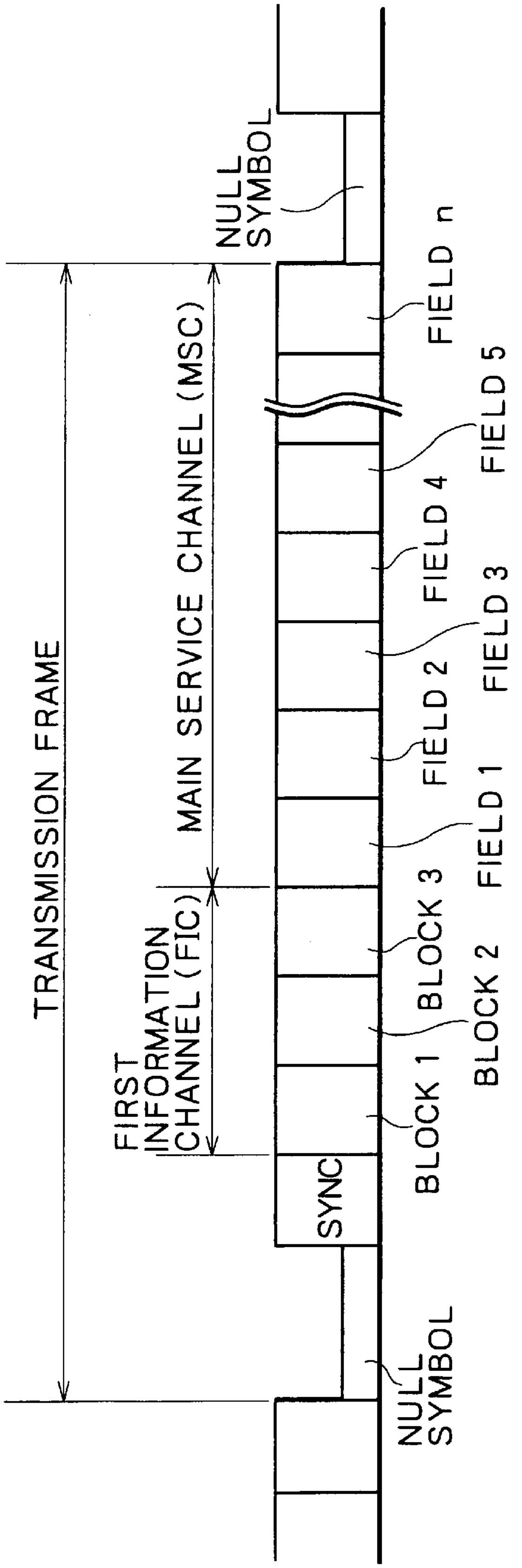
FIG. 3 is a drawing showing the structure of the frame of the DAB radio wave.

A drawing showing the frame structure of the DAB broadcast radio wave is shown in FIG. 3. Each frame of the DAB broadcast radio wave, as shown in FIG. 3 is comprised of a null symbol, a synchronizing symbols, an FIC (first information channel), and an MSC (main service channel).

As shown in FIG. 3, two synchronizing symbols are provided. The TII (transmitter identification information) is inserted in these null symbol spaces by using a plurality of carriers.

Three FIC symbols (block 1–block 3) are provided to allow transmission of various information as broadcast-related information. For instance, the information transmitted by FIC includes multiplexed arrays of broadcast programs, labels such as broadcast station names (ensemble labels) and broadcast names (program labels), information showing the type of broadcast program, regional program identification information to identify whether or not regional programs are broadcast for a specified region, and information such as for broadcast program service areas and data bases for TII related later on, for specifying the position of a broadcast transmit site.

The many above types of information are transmitted by a plurality of FIC frames. Therefore, highly important information is transmitted frequently, while information of low-level importance is transmitted in pieces over time. Then, as related before, supplemental information and control information other than the broadcast program is all transmitted within two minutes.

The MSC as shown in FIG. 3 is comprised of a plurality of data fields 1–n for a plurality of multiplexed broadcast programs. In other words, a plurality of multiplexed audio data on the DAB broadcast wave is the data for each MSC data field 1–n.

The DAB receiver then extracts the broadcast program specified by the user from the plurality of broadcast programs multiplexed onto the DAB broadcast radio wave, by utilizing multiplexing information and broadcast program identification information contained in the previously described FIC. After extracting the specified broadcast program the DAB receiver reproduces (plays) that program so as to be heard by the user.

The receiver of the embodiment as shown in FIG. 1, operates as described below to receive the DAB broadcast radio wave multiplexed with a plurality of broadcast programs and all types of control information and supplemental information.

The DAB broadcast radio wave received by an antenna 11 is supplied to a tuner 12. The tuner 12 is comprised of a tuner section, intermediate frequency (IF) converter, and orthogonal demodulator. The DAB broadcast radio wave is tuned in and converted to an intermediate frequency (IF) signal, based on a tuning control signal supplied from the controller 19. The I component and the Q component signals of the baseband signal are then demodulated from the intermediate frequency (IF) signal and supplied to the A/D converter 13.

The A/D converter 13 converts the I component and Q component analog signals from the tuner 12 into a digital signal and supplies this digital signal to an FFT 14. The FFT14 performs OFDM demodulation of the digital I component and Q component signals, and the demodulated, acquired DAB signal (ensemble signal) is supplied to the Viterbi decoder 15.

In the FFT 14, each frame in the nil symbol space of the DAB broadcast radio wave is sampled and FFT processing performed so that the carrier inserted in this space is detected and supplied to the controller 19. The controller 19 converts the carrier from the FFT 4 into a pattern No. and a comb No., by utilizing a generating formula and pattern table. This formula and pattern table form the transmission site identification information (TII) for the transmitting site sending the DAB broadcast radio wave. This pattern No. is called the main ID and the comb No. is called the sub ID.

The controller 19 in this way, can detect the transmission site identification information for the transmitting site sending the DAB broadcast radio wave that was tuned in, according to the plurality of carrier patterns inserted in the null symbol space of the DAB broadcast radio wave that was received.

The Viterbi decoder 15 on the other hand, restores the original DAB signal by Viterbi decode processing. The FIC data portion from among the restored DAG signal is supplied to the controller 19. Then, as related later on, a select control signal from the user (selection instructions) is supplied to the Viterbi decoder 15 from the controller 19. Audio data is extracted from the broadcast program specified by means of the select control signal from among the plurality of broadcast programs multiplexed on the DAB broadcast signal and this audio data is supplied to the MPEG decoder 16.

The MPEG decoder 16 elongates the MPEG compressed audio data and supplies it to the D/A converter 17. The D/A converter 17 converts the digital/audio signal supplied from the MPEG decoder 16 to an analog signal and supplies this analog signal to a speaker 18. The broadcast program can in this way be extracted from the DAB broadcast radio wave and be heard by the user.

In the case of a DAB transmission, the data base (TII data base) corresponding to transmission site position information specified by the transmission site identification information and the plurality of transmission site identification information is sent by FIC (first information channel). Therefore, if position information corresponding to the transmission site identification information detected in the controller 19 as related before, is from a data base sent by the FIC, then the transmission site position of the broadcast radio waves that are being received and tuned in can be specified.

Figures 4A, 4B, 4C, 4D:
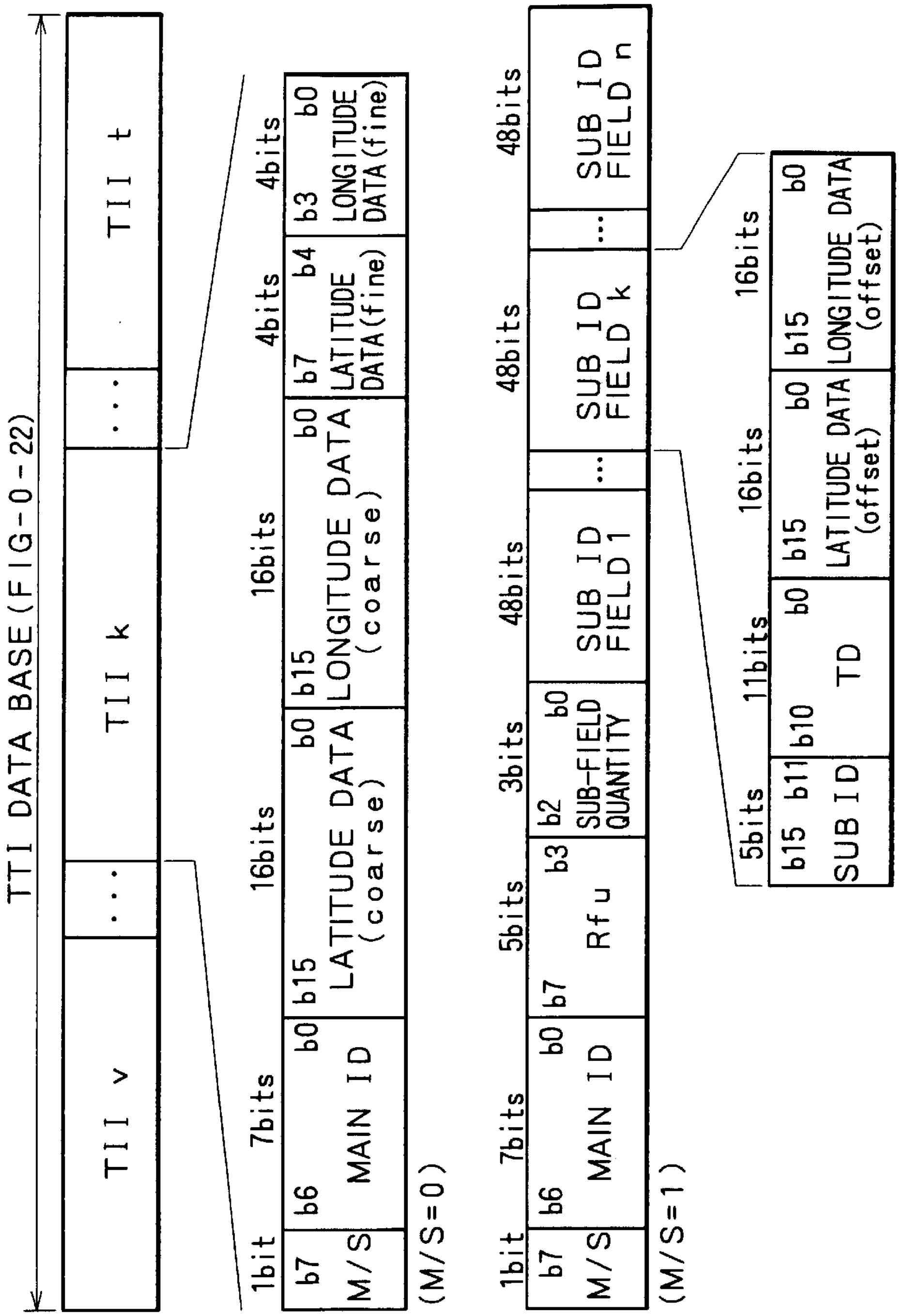
FIGS. 4A to 4D are drawings showing the TII (transmitter identification information) data base transmitted by means of the FIC (first information channel) of the DAB radio wave.

A drawing describing the format of the TII data based sent by the FIC is shown in FIG. 4. The (FIG-0-22) listed in FIG. 4 is the type No. for the data format in Eureka 147. When transmitting the TII data base, the FIC as shown in FIG. 4A is divided up into a plurality of spaces for transmitting data showing the main transmit site position (FIG. 4B) or data showing the sub transmit site position (FIG. 4C).

Data showing the main transmit site position or data showing the sub transmit site position is indicated by the M/S (Main/Sub) flags at the beginning (lead position) of the divided up spaces of the FIC. If the M/S flag is “0” then the data shows the main transmit site position and if the M/S flag is “1” then the data shows the sub transmit site position.

As can be seen in FIG. 4B, the data showing the main transmit site position is comprised of the main ID, coarse latitude information (Latitude coarse), coarse longitude information (Longitude coarse), fine latitude information (Latitude fine), and fine longitude information (Longitude fine).

An accurate latitude for the main transmit site position can be acquired by performing arithmetic operations to match the rough latitude information with the fine latitude information. In the same way, an accurate longitude for the main transmit site position can be acquired by performing arithmetic operations to match the rough longitude information with the fine longitude information.

Also, as shown in FIG. 4C, data showing the sub transmit site position is comprised of the main ID, subfield quantity, sub ID field 1, . . . etc. The RFU in FIG. 4C is an empty zone established for future expansion. Each sub ID field, as shown in FIG. 4D, is comprised of a sub ID, time delay (listed as TD in FIG. 4D), latitude information, and longitude information. The latitude information and longitude information for a sub ID field is the amount of offset of the particular sub ID from the main transmit site position.

The offset position according to the latitude information, and longitude information of the sub ID fields from the main transmit site position shown in FIG. 4D is therefore the sub transmit site position designated by the sub ID. In this way, the sub transmit site position belonging to that main transmit site can be accurately specified with little information, by utilizing the position of the main transmit site.

The transmission site position for a DAB broadcast signal multiplexed with transmission site identification information (TII), and a TII data base, can in this way be accurately detected by the receiver.

The receiver of the embodiment of this invention as subsequently explained, can rapidly and accurately tune in the desired DAB broadcast radio wave in a simple operation utilizing the transmission site position of the DAB broadcast radio wave and can select and tune in the desired broadcast program from among a plurality of broadcast programs provided while multiplexed on the DAB broadcast radio wave and allow that broadcast program to be heard by the listener.

The receiver of this embodiment is comprised of a navigation device 20, and a display device 30 as previously related. The navigation device 20 acquires its own current position by utilizing the GPS 221 installed inside the navigation device 20. The antenna 21 receives the GPS radio wave signal from the artificial satellite. Then, the map information display controller 22 loads from the CD-ROM 100, map information including the receiver's own current position obtained by utilizing the GPS 221. This map information is supplied to the display device 30 and controlled for display of a map on the LCD 31 of the display device 30.

The display device 30, besides displaying the map information from the navigation device 20 on the display screen 31D of the LCD 31, also displays the receiver's own current position acquired by utilizing the GPS 221.

Further, the receiver of this embodiment, the controller 19 extracts broadcast-related information such as transmission site information, the broadcast station name (ensemble label) that was received, as well as the broadcast name (program label) of the regional program, from the DAB broadcast radio wave. Identification of whether the program is a regional broadcast or not, can be performed based on regional identification information sent by way of the FIC.

Then, based on the extracted transmission site information, the controller 19 designates display positions on the display screen 31D of the LCD 31 for broadcast-related information such as marks to show the transmission site position, the extracted broadcast station name, and the program name of the regional program; and supplies information for the position display, marks showing the transmission site positions, broadcast station names and program names to the display device 30; and implements display of program names, broadcast station names and marks showing the broadcast station position overlapped onto the map displayed on the LCD 31.

The display device 30 displays marks showing the transmission site position, the broadcast station name matching the broadcast radio wave sent from that transmission site and the program name of the regional program, on the map displayed on the LCD 31 based on the program name, broadcast station name, marks showing the transmission site, and display information from the controller 19.

Figure 5:
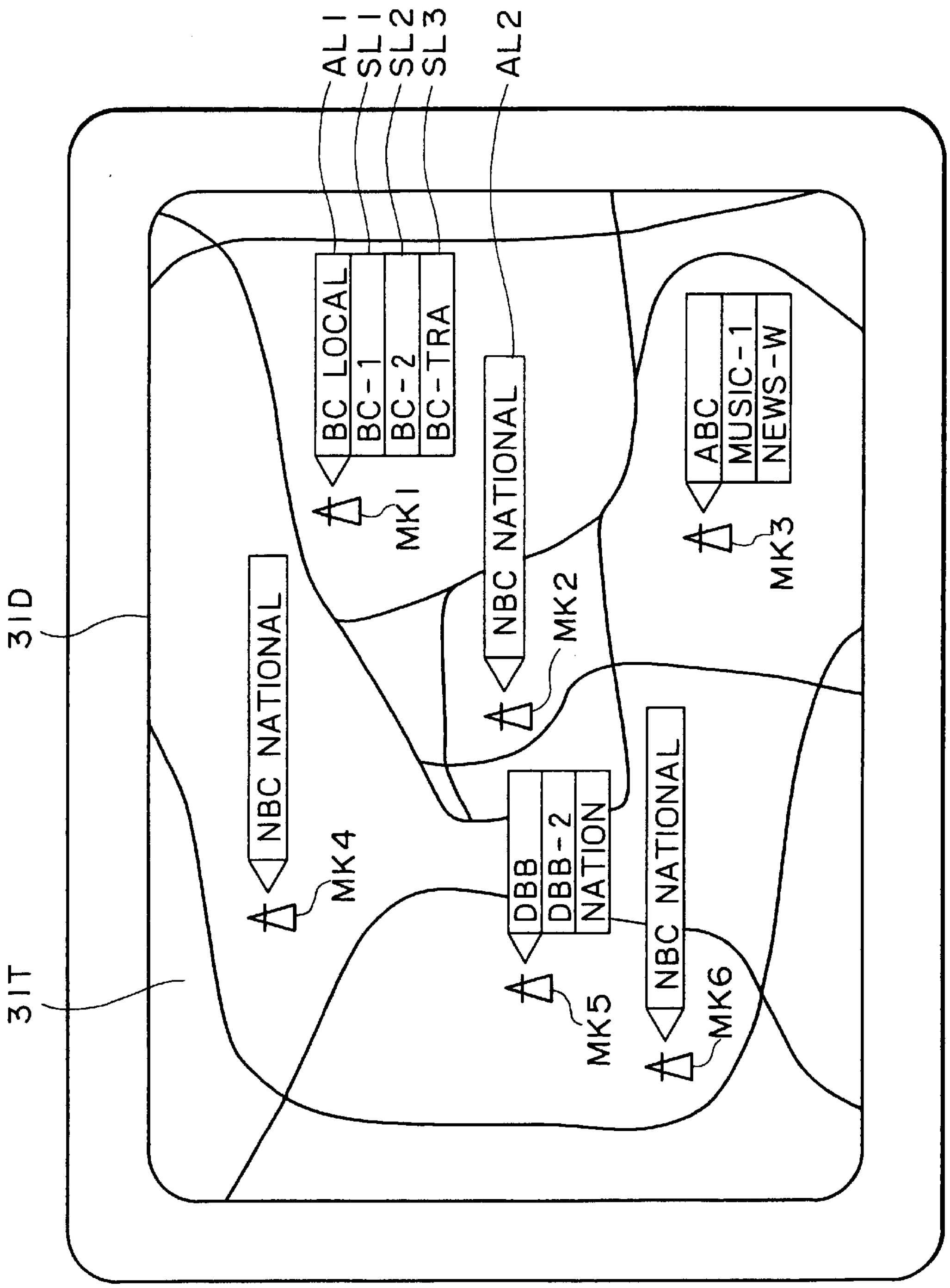
FIG. 5 is a drawing showing a sample display of program names, broadcast station names and transmission site positions.

A drawing illustrating a sample display of screen information displayed on the display screen 31D of the display device 30 is shown in FIG. 5. The display device 30 displays the transmission site position for the received DAB radio broadcast waves, on the map shown on the display screen 31D of the LCD 31 based on the marks showing the transmission site position from the controller 19, and the display position information for those marks. In the example in FIG. 5, MK1–MK6 are marks showing the position of the transmission site.

The display device 30 also displays the broadcast station name of the broadcast radio wave sent from that transmission site, in the vicinity of the marks showing that transmission site position based on display position information for the broadcast station name, and the name of the broadcast station from the controller 19. The display device 30 also displays program name on the displayed map when regional programs are multiplexed on the currently received and tuned in broadcast radio waves since the display position information for that program name is also transmitted.

In FIG. 5, the uppermost display of all the text display information is for instance, a display of the station names, AL1 and AL2. The display of broadcast station names below is a display of regional program names such as SL1, SL2 and SL3. When only broadcast station names are displayed as in this example, then it indicates regional programs are not being broadcast on the broadcast radio waves sent from the transmission site.

Also, in the receiver of this embodiment, the display position of the broadcast station name and tuning information such as for tuning in broadcast radio waves corresponding to that broadcast station name, are matched and stored in the RAM 193 of the controller 19. Further, when the program name of the regional program is displayed, the display position for the program name and the tuning information for the broadcast radio waves multiplexed with those broadcast programs, and program selection information such as service ID used as information for selecting that regional program are matched and stored in the RAM 193 of the controller 19.

The display position information here is generated in the controller 19 based on the position information of the transmission site as extracted from the broadcast radio waves, for supply to the display device 30. The tuning information for controlling the tuner 12, is information that is monitored by the controller 19. Also, program selection information such as the service ID is extracted from the FIC (first information channel) of the received broadcast radio waves.

In the receiver of this embodiment, besides displaying the program name of the regional program, the display position for the regional program name, the tuning information and the selection information are matched and stored in the RAM 193 of the controller 19 so that the desired regional program can be reliably selected in a simple operation and can be heard by the user.

The regional program in other words, is a broadcast for a particular region and for instance, traffic information for a particular region may be broadcast as the regional program. In cases for instance where a mobile receiver of this embodiment is mounted in a vehicle, then the user will want to hear regional programs such as traffic broadcasts of the region to be driven through.

So, in order to be able to reliably select and hear a regional program receivable at the current position of the receiver itself by means of an easy operation, the display of the regional program name, as well as the display position of the program name, the tuning information, and the selection information are matched and stored in the RAM 193 of the controller 19.

As previously related using FIGS. 1 and 2, a touch panel 31T is installed on the display screen 30D of the display device 30. When the user touches a finger on the touch panel 31T, a coordinate detector 32 and the touch panel 31T detect the coordinates of the contacted (touched) position on the display screen 31. These detected coordinates are supplied to the controller 19 as selection command information.

In FIG. 5 for example, when the user touches a finger on the display position for broadcast station name AL2, the coordinates for that position are returned to the controller 19. The controller 19, based on the coordinate information from the coordinate detector 32, detects the tuning information matching the broadcast station name or program name for the display position (coordinate information) or detects the tuning information and selection information in the RAM 193 of the controller 19.

The controller 19 in other words, matches the coordinate information from the coordinate detector 32 with coordinate information in its own RAM 193 showing the broadcast station name display position or with the program name display position, and detects the selected display information. For instance, the broadcast station name held in the memory of the RAM 193 of the controller 19 or the coordinate information showing the program name display position can show the display region on the display screen by holding coordinate information for two points on a diagonal line of the broadcast station name and program name display area. By then detecting whether or not the coordinate information from the detector 32 is shown within the area for those two coordinate points, the kind of display information that was selected can be detected.

Then, the tuning information matching the display position of the detected display information, or the tuning information and program selection information are loaded (read out). The tuning information is supplied to the tuner 12 and the desired DAB broadcast radio wave is tuned in. The program selection information is also supplied to the Viterbi decoder 15, and the desired audio data of the broadcast program is extracted from the DAB broadcast radio wave that was tuned in. This audio data is supplied to the MPEG decoder 16.

The receiver of this embodiment of the invention is further able to scan broadcast radio waves of all receivable frequencies in response to user operation in order to display on the map shown on display screen 31D, all receivable DAB broadcast radio waves per the current position.

In this scanning process, the tuning frequency of the broadcast radio waves is changed a slight amount at a time by the tuner 12 by means of tuning control signals from the controller 19, and actual tuning to detect tunable broadcast radio wave is performed. When tuning of a broadcast radio waves has been achieved, the controller 19 at this time extracts information such as transmission site identification information detection, transmission site position information, broadcast station names, program names and program ID from broadcast-related information of the IFC as related previously. The controller 19 then displays information on the display screen 31 according to the extracted information and also stores necessary information onto the RAM 193.

In the example shown in FIG. 5, broadcast radio waves can be received from six transmission sites. Of these six sites, transmission site positions shown by mark MK2, mark MK4 and mark MK6 are transmitted by a broadcast radio wave from the same broadcast station. In the case of DAB broadcasts, broadcast radio waves on the same frequency for the same broadcast stations at a plurality of transmission site positions relatively close to each other are formed into a single frequency network (SFN)

The broadcast waves from transmission site positions indicated by mark MK2, mark MK4 and mark MK6 can therefore be received without having to change the tuning frequency and the respective transmission site positions can also be identified.

When regional broadcasts are not being made, then for instance, only the broadcast station name such as AL2 is displayed. In the case only of this so-called wide area broadcast program, by specifying the broadcast station name display position, the broadcast radio wave matching that station name is automatically tuned in and then a program list for selecting one broadcast program from among a plurality of broadcast programs being offered, are displayed on the display screen 31D so that the user can select the desired broadcast program.

The receiver of this embodiment therefore allows transmission site positions for receivable broadcast radio waves to be checked on the map shown on the display screen 31D, and tuning or program selection of the desired radio broadcast wave or regional program can be performed by simply touching the display screen.

Furthermore, since the transmission site position can be accurately known from the map shown on the display screen, a broadcast radio wave being transmitted from the direction the user is headed, can be tuned in. A broadcast radio wave from a direction the user is headed away from, will therefore not be mistaken for a broadcast received from a transmission site in the direction the user is headed towards. Also, a regional program of a desired region, receivable at the current position of the receiver can be selected and listened to by means of a simple operation.

In the receiver of this embodiment a display of marks indicating the transmission site position, the broadcast station names, and the program names was made, however the receiver can also display just the marks indicating the transmission site position or just the broadcast station names, or the receiver can display the broadcast station name and marks indicating the transmission site position and not display the program name of the regional program.

In the case of these kinds of displays, the current position can also be checked by the map display of receivable-tunable broadcast radio waves, and the broadcasts from a broadcast station in the direction the user will be heading in can be tuned in.

[Displays of the area and area names]

However, when a regional program is being broadcast, knowing for what area that regional program is being broadcast, or in other words, knowing the service area for that program is convenient. If the service area for a regional program is known, then that regional program can be easily identified as to whether or not it is the region required by the user of the receiver of this embodiment so that mistakenly listening to a regional program different from the required regional program will not occur.

In the case of a DAB, geographical information on the service area of that regional program, and service area names are transmitted as broadcast-related information on each broadcast program by means of the FIC of each frame of the broadcast radio wave. Therefore, the receiver of this embodiment can display geographical information and service area names contained in the broadcast radio wave, on the map shown on the display screen 31D.

Figure 6:
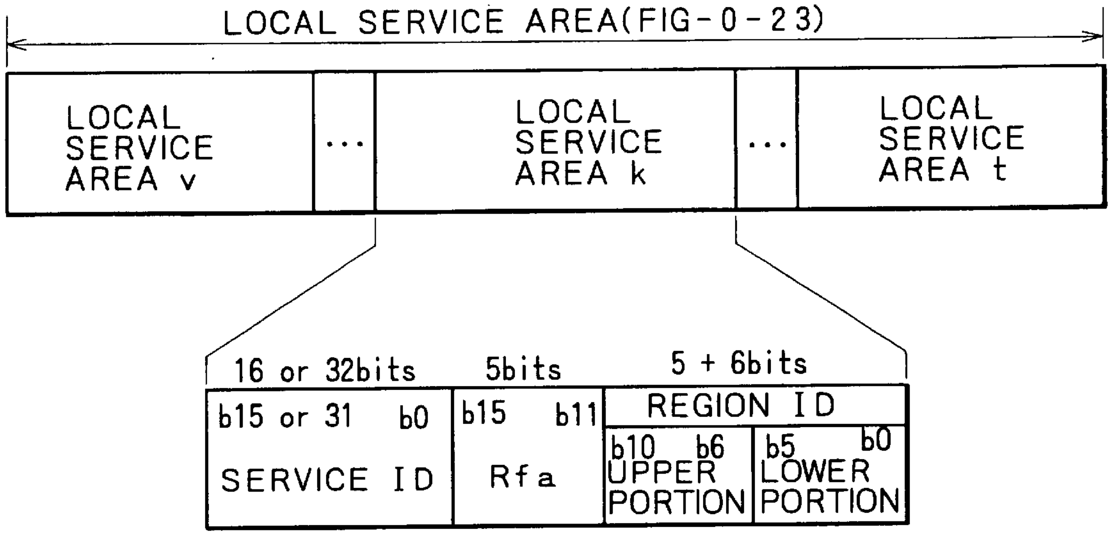
FIG. 6 is a drawing describing the local service area information transmitted by means of the FIC (first information channel) of the DAB radio wave.
Figure 7:
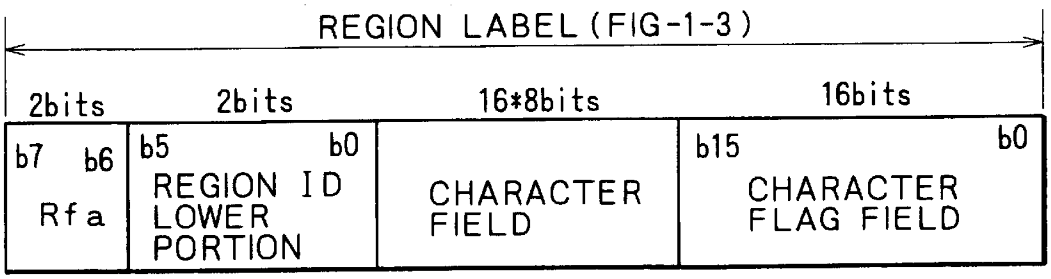
FIG. 7 is a drawing describing the region label information transmitted by means of the FIC (first information channel) of the DAB radio wave.

FIGS. 6, 7 and FIGS. 8A to 8F are drawings for illustrating information on service areas of broadcast programs transmitted by means of the FIC of the DAB broadcast radio wave. Of these drawings, FIG. 6 shows the format for local service area information showing the service areas for each broadcast program. FIG. 7 shows the format for region labels providing the service area names. FIGS. 8A to 8F show the format for region identification information for actually specifying the service area of a broadcast program.

The FIG-0-23, FIG-1-3, FIG-0-11 listed in FIGS. 6, 7 and FIGS. 8A to 8F respectively indicate the type No. of the data format in Eureka 147.

In the DAB, local service area information showing the service areas for each broadcast program multiplexed onto that broadcast radio wave are transmitted as shown in FIG. 6. This local service area information is comprised as shown in FIG. 6, of one service ID for each broadcast program, and also a region ID for specifying the service area of the broadcast program specified by the service ID. The Rfa listed in FIG. 6, is an empty area established for future expansion.

The region label as shown in FIG. 7, is comprised of a region ID sub-section (lower 6 bit portion), a character field presenting a name for the region, and a character flag field. Local service area information is therefore obtained based on the service ID of the broadcast program that was made audible, and a region label for the service area of that broadcast program is obtained based on the sub-section of the region ID for the local service area information, thus allowing a service area name for that broadcast program to be obtained.

The region identification information transmitted in the format shown in FIGS. 8A to 8F, is partitioned into a plurality of spaces (or segments) for transmitting different region identification information according to the area type, and region ID by means of the FIC as shown in FIG. 8A. The region identification information transmitted by partitioning it into FIC segments, is comprised as shown in FIG. 8B, of area type, region ID, and geographic regional information.

The geographic regional information is information showing what kind of area the service area for the broadcast program actually is. This geographic regional information has a TII list for specifying broadcast program service areas, made up of a TII group or in other words a transmission group formed of a main transmission site and a plurality of sub-transmission sites, and rectangular region information for specifying service areas by means of rectangular areas formed from latitude information and longitude information The difference between the information of the TII list and the rectangular region information can be identified by means of the area type. In other words, the area type is "0000" when the geographic regional information is the TII list, and the area type is "0001" when the geographic regional information is the rectangular group information.

The TII list, as shown in FIG. 8C is comprised of the TII list length, and a plurality of transmission groups. Each transmission group, as shown in FIG. 8D is comprised of a main ID, sub ID list length, and sub ID list.

The sub ID list, as shown in FIG. 8E is comprised of a sub-ID for a plurality of sub transmission sites belonging to transmission sites specified by the main ID. The service area indicated by means of the region ID on the TTI list is specified by the main transmission site, and sub transmission site.

The rectangular region information as shown on FIG. 8F, is comprised of latitude information (coarse) showing the peak position of one of the diagonal lines of the rectangular area corresponding to the service area; longitude information (coarse) and, latitude information (extent) showing the other peak position, and longitude information (extent). The service area indicated by means of the region ID on this rectangular region information is specified as the rectangular area.

In the receiver of this embodiment regional programs are multiplexed on the received radio broadcast wave, and when set to display the program names of those regional programs, the service areas for those regional programs are also displayed on the map on the display screen 31D.

The controller 19 in other words, detects the local service area information having the service ID for the regional program, from the local service area information that was extracted from the FIC of the broadcast radio waves that were received and tuned in. Then, based on this region ID information from the detected local area service information, the geographic region information is detected from the region identification information extracted from the FIC. This geographic region information is information specifying the service area of the applicable regional program.

Figure 9:
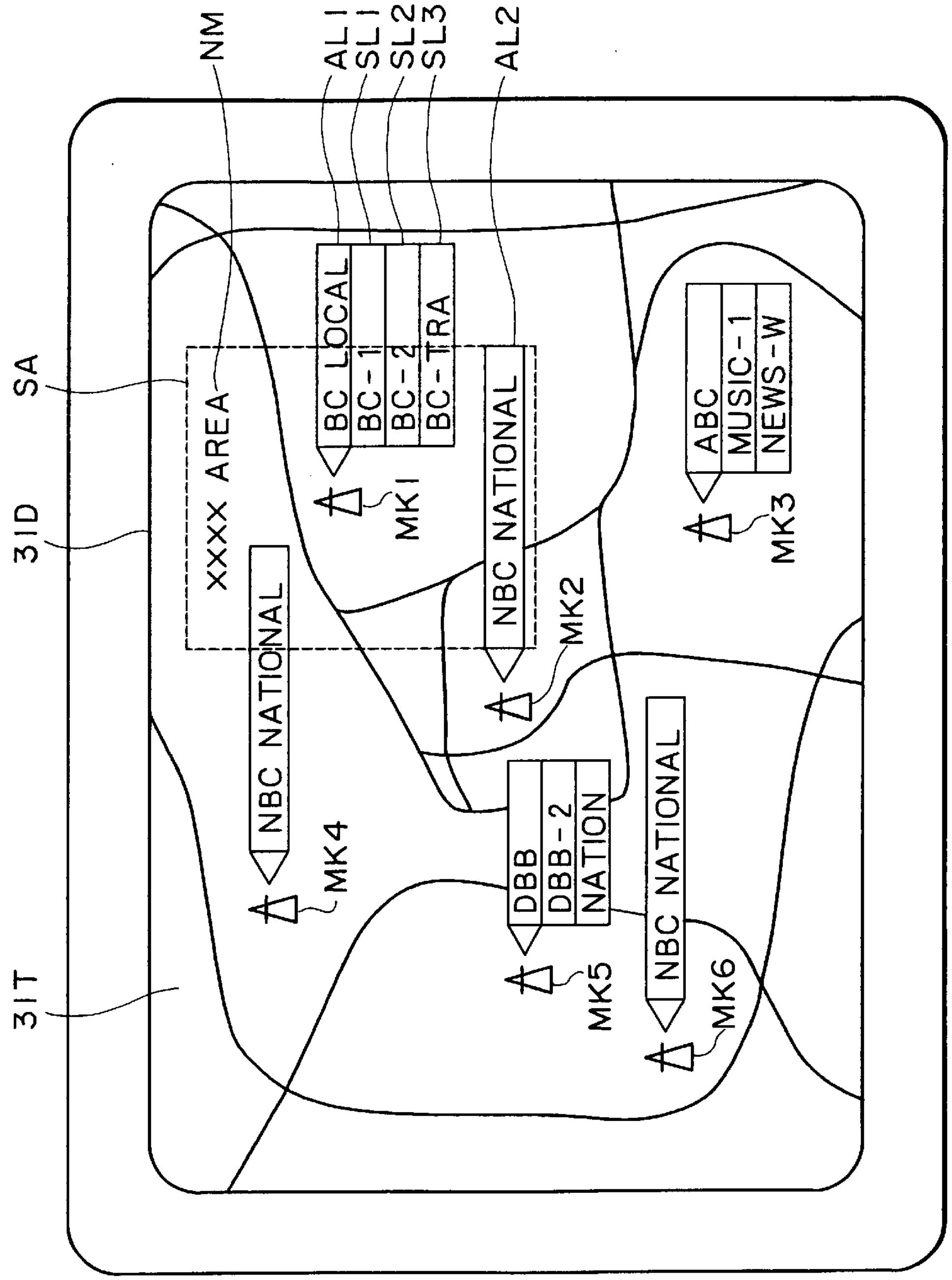
FIG. 9 is a drawing showing a sample display of regional program service areas.

The controller 19 then supplies the detected geographic region information to the display device 30, and displays the service area of the region program as a rectangular area on the display screen 31D of the display device 30. FIG. 9 is a drawing showing a typical display when set to display the service area with BC-1 for the program name, utilizing rectangular area information with an area type "0001" as the geographic region information.

As previously related, the regional program BC-1 for the SA service area is shown on the display screen on the map shown on the display screen 31D as shown in FIG. 9, based on the rectangular region information (FIG. 8F) for the region identification information detected in sequence utilizing the service ID. The user can therefore check the service area of the regional program on the display screen. The regional program for the desired region can thus be quickly checked and a selection made and reliably selected by means of a simple operation.

The service area name NM can also be displayed on the display screen 31D of the display device 30 as shown in FIG. 9, by detecting the matching regional label mentioned above (FIG. 7) using the service ID for the regional program and supplying the regional label to the display device 30.

When many regional programs are being broadcast, the service area and service area names of each regional program are extracted from the service information, region identification information and region label as described above and the service areas of the respective regional programs are displayed on a map shown on the display screen 31D.

The TTI list with the area type "0000" can of course also be utilized as the geographic region information. In such cases, the positions for the main transmission site and the sub-transmission site can be specified from the main ID and the sub ID information on the TTI list as previously described and the service area of the selected regional program can be displayed.

Since a check can be made visually of what region's service is provided in the respective plurality of regional programs, the user can therefore easily select the regional program for the desired region.

Further, the service area and service area of the regional program need not be displayed from the start but rather the selected regional program service area and service area name can be displayed from the time the regional program is selected. In this kind of case, the selected program can be visually confirmed as to whether it is the desired regional program or not.

The display of the program name and broadcast program is not limited to character (letter) information as in the above embodiment. Displays can also be made for instance, using icons or letter shapes matching the program names and broadcast station names. Also, the various types of related information for the broadcast radio waves such as frequency information of the broadcast radio waves that were tuned in, and logo marks of the broadcast station may be displayed at positions on a map according to position information extracted from the broadcast radio waves.

In this case, information not multiplexed onto the broadcast radio wave such as icons and logo marks of the broadcast station may be matched and stored beforehand in the memory of the receiver.

Also, rather than displaying the program name of the regional program, the broadcast station names of regional programs multiplexed on the broadcast radio waves, and broadcast station names of regional programs not multiplexed on the broadcast radio waves may be displayed by changing the color of the display so that from what transmission site the broadcast radio waves multiplexed with regional programs are being transmitted from can be reported.

Further, the broadcast station name of the broadcast radio wave multiplexed with regional program names may be shown highlighted or as a flashing display so that from what transmission site the broadcast radio waves multiplexed with regional programs are being transmitted from can be reported.

Also, if for instance, marks showing the position of the transmission site, and frequency information of broadcast radio waves sent from that transmission site are displayed, then, along with allowing a visual check to be made of the transmission site position on a map, the broadcast radio waves can also be tuned based on the displayed frequency information.

Further, for instance, if marks showing the position of the transmission site, and selection information for a regional program such as the service ID are displayed, then, along with allowing a check to be made visually by way of the transmission site position on a map, the desired regional program can be selected based on the program selection information that is displayed.

In such kinds of cases, there is no need to match and store the display position of the station name and the tuning information in the memory, and no need to match and store the display position of the program name of the regional program, the tuning information, and the program selection information in the memory.

The receiver of the above embodiment was configured to detect the receiver's own current position and to display map information containing the receiver's own current position on a display screen 31 of the display device by utilizing the GPS 221 installed in the navigation device 20, however the GPS may be omitted.

In other words, in the case of DAB, a single frequency network (SFN) is formed as related before, and a DAB broadcast radio wave of the same frequency is transmitted from a plurality of transmission locations. Consequently, DAB radio waves from a plurality of transmission sites can be received and tuned in even if a DAB broadcast radio wave of the same frequency is tuned in However, the distances between each transmission site and receiver are different so there are time differences or time lags in the time it takes for a broadcast radio wave from a transmission site to arrive at a receiver. By detecting these time differences (phase differences) a comparatively accurate position can be found for the applicable receiver, based on phase information for each transmission site and these time differences. The current position that was found can be loaded (read out) from a CD-ROM stored with map information containing this current detected position and shown on a display screen.

As shown in FIG. 5, when the program names and broadcast station names shown on the display screen are selected by the user, the selected broadcast station name or program name can be shown by a method such as a highlighted display, so that what broadcast radio waves or what regional programs were selected can be clearly known by the user. Further, when a regional program was selected, the display showing the service area for the selected regional program can of course, be shown in a color different from the display of the other regional program service areas, or just the selected regional program service area shown on the display.

When broadcast radio waves of a wide area broadcast not broadcasting any regional programs are tuned in from the display screen, a list of broadcast programs transmitted on that broadcast radio wave is displayed as related before, and a broadcast program can be selected. After a program from the broadcast program list is selected, the display screen again shows the map information, marks showing the transmission site position, the broadcast station name, and program name as shown in FIG. 5, and a broadcast radio wave can be tuned in or a broadcast program can be selected from the map displayed on the display screen of the display device 30.

In the receiver of the above described embodiment, a touch panel was installed on the display screen so the broadcast wave could be tuned in or the broadcast program selected by simply touching the display screen, however this invention is not limited to this method. For instance, along with displaying cursors for specifying positions on the display screen, cursor operation keys can be provided to move the cursor up and down and left and right on the screen, and the broadcast radio waves and program can be tuned in and selected by shifting the cursor with these cursor operation keys.

Also a trackball may be used instead of the cursor operation (movement) keys. In other words, any type of pointing device may be utilized to specify the desired position on the display screen.

Further, the above embodiment described an example of a vehicle-mounted receiver applicable to this invention, however this invention is not limited to this method. A portable receiver for instance may also be applied to this invention, and a fixed-installation type receiver such as utilized in homes may also be applied to this invention.

In the above fixed-installation type receiver, instead of displaying the regional programs, the program names can be displayed on a map to allow selection from the user's favorite type of programs. In other words, in the case of DAB, information capable of distinguishing broadcast programs multiplexed onto the broadcast radio waves such as, news programs, sports programs, music programs is transmitted by way of the previously described FIC, so that the position of the transmission site broadcasting the desired program, the broadcast station name for the broadcast radio waves sent from that transmission site, and the user's favorite program names and similar information can be displayed on a map, and the user can therefore make use of this easily understandable visual means to tune in a broadcast wave and select a broadcast program.

What is claimed is:

1. A receiver comprising:

receiving means for receiving a digital audio broadcast radio wave containing broadcast-related information which contains at least position information about a transmission site of said broadcast radio wave;

display means;

map display control means for displaying a map on said display means;

information extraction means for extracting said broadcast-related information including broadcast station names and associated regional program information including traffic reports from said digital audio broadcast radio wave;

information display control means for displaying on said map displayed on said display means said broadcast station names and regional program information extracted from said digital audio broadcast radio wave at respective display positions determined according to said transmission site position information extracted by said information extraction means; and a touch panel overlaid on said display means, whereby a user can select a desired broadcast station or desired regional program information by touching a corresponding location on the touch panel.

2. The receiver claimed in claim 1, further comprising:

information storage means for storing information relating to said broadcast station names and regional program information displayed on said map along with tuning information for said digital audio broadcast radio wave received by said receiving means; and tuning control means for loading, from said memory information storage means, respective tuning information matching the desired broadcast station or desired regional program information selected by the user and tuning in said digital audio broadcast radio wave based on said tuning information.

3. The receiver claimed in claim 1 or 2, further comprising position measurement means for measuring said receiver's current position by receiving a radio wave from an artificial satellite, wherein said map display control means receives said current position supplied by said position measurement means and displays said map containing said current position on said display means.

4. The receiver claimed in claim 1 or 2, wherein said information display control means displays a mark indicating the transmission site position of said broadcast radio wave transmission site at a position on said map determined according to said position information.

5. The receiver claimed in claim 2, wherein an area name according to a service area of said digital audio broadcast radio wave is contained in broadcast-related information of said broadcast radio wave, and said information display control means displays said area name of said broadcast-related information extracted by said information extraction means, on said map shown on said display means.

* * * * *